US008813051B2

United States Patent
Dawson et al.

(10) Patent No.: US 8,813,051 B2
(45) Date of Patent: Aug. 19, 2014

(54) RUNNING MULTIPLE COPIES OF NATIVE CODE IN A JAVA VIRTUAL MACHINE

(75) Inventors: Michael Hilton Dawson, Ottawa (CA); Graeme Johnson, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 525 days.

(21) Appl. No.: 13/086,820

(22) Filed: Apr. 14, 2011

(65) Prior Publication Data
US 2012/0266147 A1    Oct. 18, 2012

(51) Int. Cl.
*G06F 9/45*    (2006.01)

(52) U.S. Cl.
USPC .......................................................... 717/148

(58) Field of Classification Search
None
See application file for complete search history.

(56) References Cited

U.S. PATENT DOCUMENTS

| | | | |
|---|---|---|---|
| 6,066,181 A | 5/2000 | DeMaster | |
| 6,282,702 B1* | 8/2001 | Ungar | 717/148 |
| 6,484,188 B1 | 11/2002 | Kwong et al. | |
| 6,567,974 B1* | 5/2003 | Czajkowski | 717/151 |
| 6,834,391 B2 | 12/2004 | Czajkowski et al. | |
| 7,353,504 B2 | 4/2008 | Lagergren | |
| 7,421,687 B1* | 9/2008 | Yellin et al. | 717/148 |
| 7,555,746 B2 | 6/2009 | Fleischer | |
| 2002/0161792 A1* | 10/2002 | Garthwaite | 707/206 |
| 2006/0129989 A1* | 6/2006 | Fleischer | 717/124 |
| 2006/0248087 A1* | 11/2006 | Agrawal et al. | 707/10 |
| 2007/0204258 A1* | 8/2007 | Chung | 717/118 |
| 2008/0184210 A1* | 7/2008 | Lee et al. | 717/136 |
| 2009/0217245 A1 | 8/2009 | Iyer et al. | |
| 2009/0300076 A1* | 12/2009 | Friedman et al. | 707/203 |

OTHER PUBLICATIONS

Binder, et al., "A Quantitative Evaluation of the Contribution of Native Code to Java Workloads," 2006 IEEE International Symposium on Workload Characterization, pp. 201-209, Oct. 2006.
Czajkowski, et al., "Automated and Portable Native Code Isolation," In Proceedings of the 12th International Symposium on Software Reliability Engineering, pp. 298-307, Aug. 2002.

* cited by examiner

*Primary Examiner* — H S Sough
*Assistant Examiner* — Daxin Wu
(74) *Attorney, Agent, or Firm* — Steven M. Greenberg, Esq.; CRGO Law

(57) ABSTRACT

A method for running multiple copies of the same native code in a Java Virtual Machine is described. In one embodiment, such a method includes providing a class to enable segregating multiple copies of the same native code. The method defines, within the class, a native method configured to dispatch operation of the native code. The method further includes generating first and second instances of the class. Calling the native method in the first instance causes a first copy of the native code to run in a first remote execution container (e.g., a first process). Similarly, calling the native method in the second instance causes a second copy of the native code to run in a second remote execution container (e.g., a second process) separate from the first remote execution container. A corresponding computer program product is also disclosed.

20 Claims, 6 Drawing Sheets

```
600
```

```
1    public class MyQuarantineClass extends Quarantine {
2        public native void native1 (String str1) ;
3        public native void native2 (String str1) ;
4    }
5
6    pubic void main() {
7        MyQuarantineClass quarantineCls1 = new MyQuarantineClass() ;
8        MyQuarantineClass quarantineCls2 = new MyQuarantineClass() ;
9
10       quarantineCls1.native1 ("test1") ;
11       quarantineCls2.native1 ("test2") ;
12   }
```

RUNNING MULTIPLE COPIES OF NATIVE CODE IN A JAVA VIRTUAL MACHINE

BACKGROUND

1. Field of the Invention

This invention relates to the Java Virtual Machine, and more particularly to methods for running multiple of copies of native code in a Java Virtual Machine supporting the Java Native Interface (JNI).

2. Background of the Invention

Implementations of the Java Virtual Machine support the Java Native Interface (JNI) as a mechanism to enable Java bytecode to call methods written in native code (e.g., C and C++) and vice versa. Traditionally, both the Java bytecode and the native code are executed in the same process and by the same thread as execution transitions between the two.

It is possible, however, to construct a Java Virtual Machine to execute native code in one or more remote execution containers which may be hosted in separate processes on the same or different machine from where the Java bytecode is executed. In such environments, the native code may not be aware that it is executing separately from the Java Virtual Machine. Separating the Java bytecode and native code in this manner may help to prevent misbehaved native code from destabilizing the Java Virtual Machine. It may also enable the native code to run in a different environment (e.g., security context, bit width, etc.) than the Java Virtual Machine.

In both traditional and distributed Java Virtual Machines, native code is restricted to running in a specific process (a single process in the traditional Java Virtual Machine, or a single remote execution container process in a distributed Java Virtual Machine). In a distributed Java Virtual Machine, different native code may run in different processes. However, each time particular native code is executed, it must run in the same process as all other invocations of the native code.

In some cases, only a single instance of native code, such as certain types of legacy code, may be executed in a process. This may be due to the native code's use of statics or other resources that are shared within the process. This limitation prevents multiple instances of the native code from executing in the same Java Virtual Machine.

In the case of a distributed Java Virtual Machine, the above-described limitations may be circumvented by creating multiple copies of the native code, each with a different name. Although effective, this technique is clumsy and requires prior knowledge of the desired number of native code copies. This technique also requires managing which instances of the native code are invoked in an application.

In view of the foregoing, what are needed are methods to enable execution of multiple copies of the same native code in a distributed Java Virtual Machine. Ideally, such methods may be implemented using a simple programming API.

SUMMARY

The invention has been developed in response to the present state of the art and, in particular, in response to the problems and needs in the art that have not yet been fully solved by currently available methods. Accordingly, the invention has been developed to provide methods to run multiple copies of the same native code in a Java Virtual Machine. The features and advantages of the invention will become more fully apparent from the following description and appended claims, or may be learned by practice of the invention as set forth hereinafter.

Consistent with the foregoing, a method for running multiple copies of the same native code in a Java Virtual Machine is disclosed herein. In one embodiment, such a method includes providing a class to enable segregating multiple copies of the same native code. The method defines, within the class, a native method configured to dispatch operation of the native code. The method further includes generating first and second instances of the class. Calling the native method in the first instance causes a first copy of the native code to run in a first remote execution container (e.g., a first process). Similarly, calling the native method in the second instance causes a second copy of the native code to run in a second remote execution container (e.g., a second process) separate from the first remote execution container.

A corresponding computer program product is also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
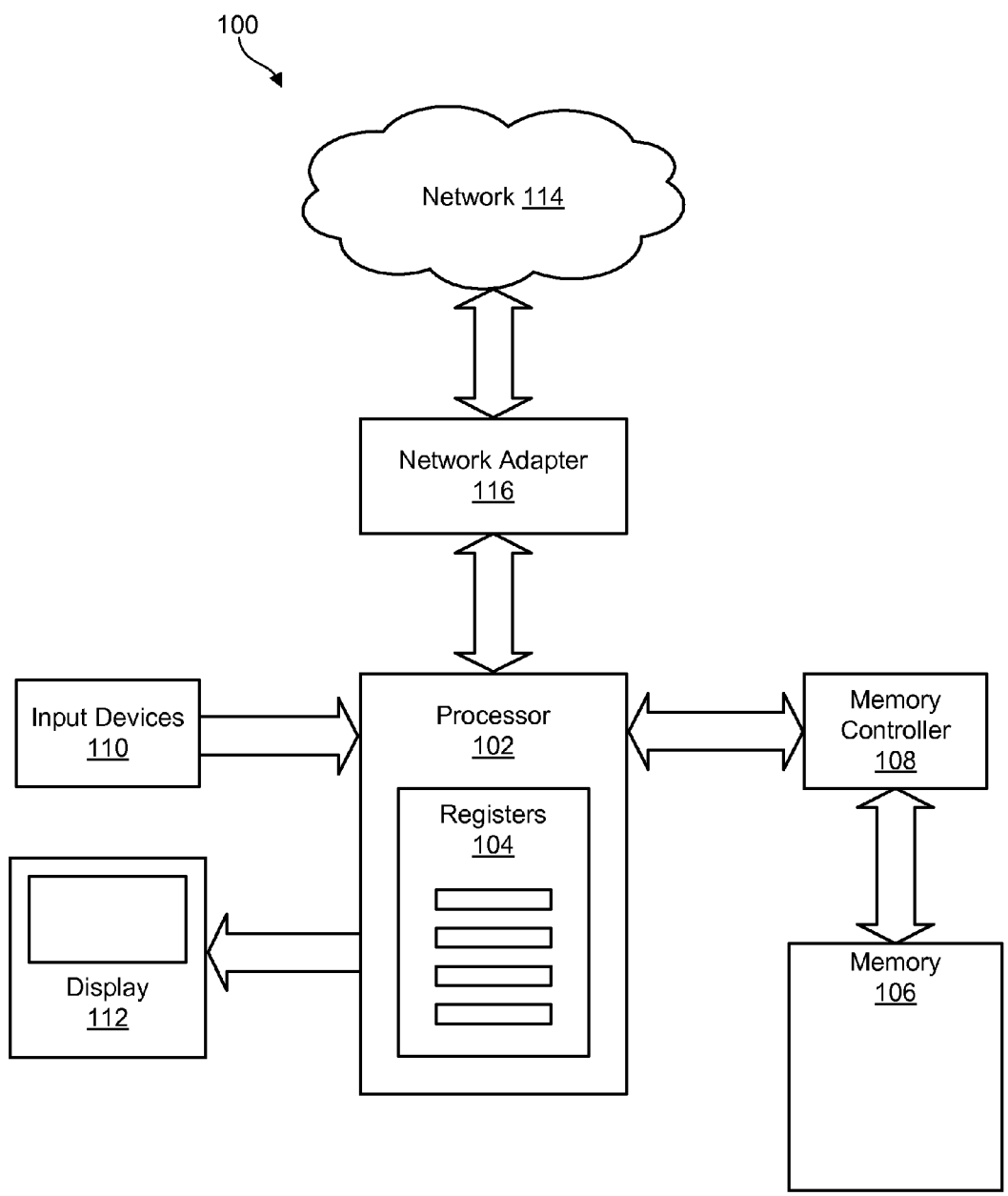
FIG. 1 is a high-level block diagram showing one example of a computer system suitable for use with various embodiments of the invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, system, method, or computer program product. Furthermore, the present invention may take the form of a hardware embodiment, a software embodiment (including firmware, resident software, microcode, etc.) configured to operate hardware, or an embodiment combining software and hardware aspects that may all generally be referred to herein as a "module" or "system." Furthermore, the present invention may take the form of a computer-usable storage medium embodied in any tangible medium of expression having computer-usable program code stored therein.

Any combination of one or more computer-usable or computer-readable storage medium(s) may be utilized to store the computer program product. The computer-usable or computer-readable storage medium may be, for example but not limited to, an electronic, magnetic, optical, electromagnetic, infrared, or semiconductor system, apparatus, or device. More specific examples (a non-exhaustive list) of the computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device. In the context of this document, a computer-usable or computer-readable storage medium may be any medium that can contain, store, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like, and conventional procedural programming languages, such as the "C" programming language or similar programming languages. Computer program code for implementing the invention may also be written in a low-level programming language such as assembly language.

The present invention may be described below with reference to flowchart illustrations and/or block diagrams of methods, apparatus, systems, and computer program products according to various embodiments of the invention. It will be understood that each block of the flowchart illustrations and/or block diagrams, and combinations of blocks in the flowchart illustrations and/or block diagrams, may be implemented by computer program instructions or code. The computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, one example of a computer system 100 is illustrated. The computer system 100 is presented to show one example of an environment where techniques in accordance with the invention may be implemented. The computer system 100 is presented only by way of example and is not intended to be limiting. Indeed, the techniques disclosed herein may be applicable to a wide variety of different computer systems in addition to the computer system 100 shown. The techniques disclosed herein may also potentially be distributed across multiple computer systems 100.

The computer system 100 includes at least one processor 102 and may include more than one processor. The processor 102 includes one or more registers 104 storing data describing the state of the processor 102 and facilitating execution of software systems. The registers 104 may be internal to the processor 102 or may be stored in a memory 106. The memory 106 stores operational and executable data that is operated upon by the processor 102. The memory 106 may be accessed by the processor 102 by means of a memory controller 108. The memory 106 may include volatile memory (e.g., RAM) as well as non-volatile memory (e.g., ROM, EPROM, EEPROM, hard disks, flash memory, etc.).

The processor 102 may be coupled to additional devices supporting execution of software and interaction with users. For example, the processor 102 may be coupled to one or more input devices 110, such as a mouse, keyboard, touch screen, microphone, or the like. The processor 102 may also be coupled to one or more output devices such as a display device 112, speaker, or the like. The processor 102 may communicate with one or more other computer systems by means of a network 114, such as a LAN, WAN, or the Internet. Communication over the network 114 may be facilitated by a network adapter 116.

Figure 2:
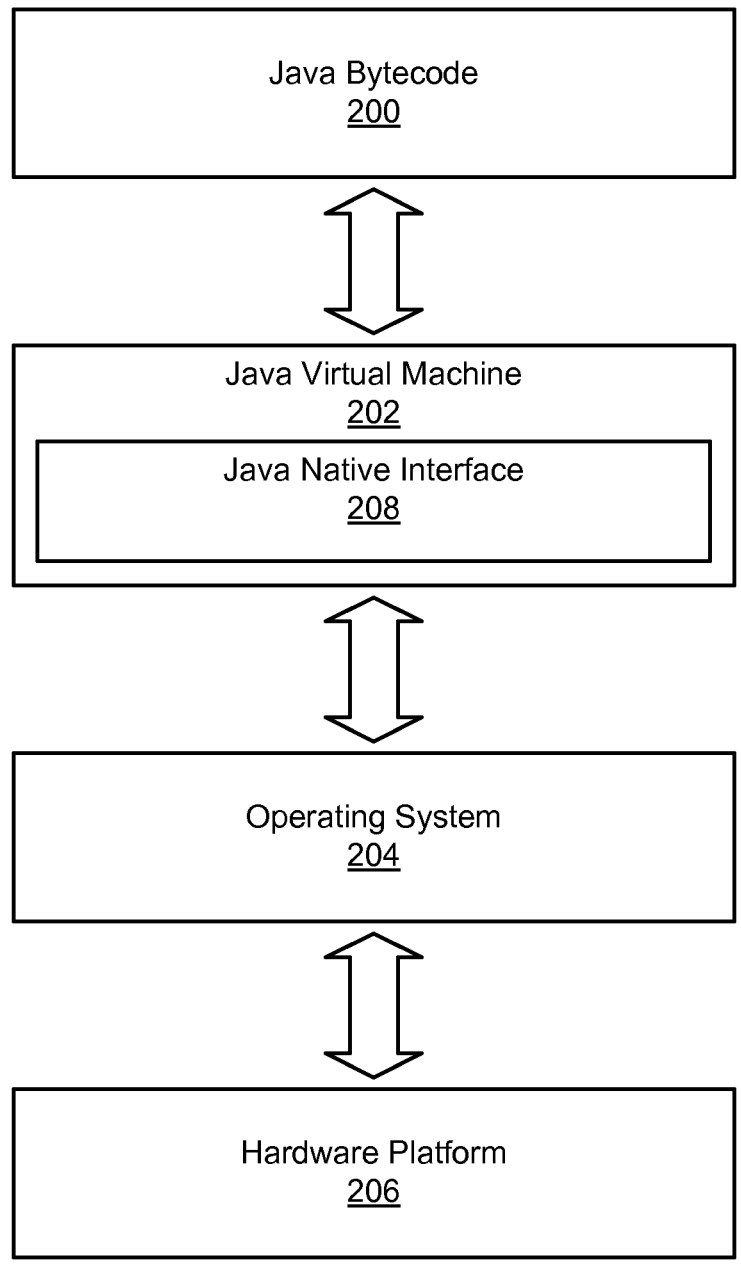
FIG. 2 is a high-level block diagram showing one example of an object-oriented managed runtime, in this example the Java Virtual Machine.

Referring to FIG. 2, one example of an object-oriented managed runtime, in this example a Java Virtual Machine, is illustrated. The Java Virtual Machine is presented to show one example of a runtime environment in which various embodiments of the invention may operate. Nevertheless, the techniques disclosed herein are not limited to the Java Virtual Machine but may operate or be adapted to operate in other object-oriented managed runtimes. Other non-limiting examples of runtime environments in which embodiments of the invention might operate include the Microsoft Common Language Runtime (CLR) and Smalltalk runtime. Thus, although particular reference is made herein to the Java Virtual Machine, the principles taught herein are not limited to the Java Virtual Machine but may also be applicable to other runtime environments.

As shown in FIG. 2, a Java Virtual Machine 202 may be configured to operate on a specific platform, which may include an underlying hardware and operating system architecture 204, 206. The Java Virtual Machine 202 receives program code 200, compiled to an intermediate form referred to as "bytecode" 200. The Java Virtual Machine 202 translates this bytecode 200 into native operating system calls and machine instructions for execution on the underlying platform 204, 206. Instead of compiling the bytecode 200 for the specific hardware and software platform 204, 206, the bytecode 200 is compiled once to operate on all Java Virtual Machines 202. A Java Virtual Machine 202, by contrast, may be tailored to the underlying hardware and software platform 204, 206. In this way, the Java bytecode 200 may be considered platform independent.

As shown, the Java Virtual Machine 202 may support the Java Native Interface 208 as a mechanism to enable Java bytecode 200 to call methods written in native code (e.g., C and C++) and vice versa. Unlike the Java bytecode 200, the native code may be written for the underlying hardware and operating system platform 204, 206. The Java Native Interface 208 may allow a developer to write native methods to handle situations where an application cannot be written entirely in the Java programming language, such as when the Java class library does not support platform-specific features or program libraries. The Java Native Interface 208 may also be used to modify an existing application—written in another programming language—to be accessible to Java applications. The Java Native Interface 208 may allow native methods to create and use Java objects in the same way that Java code creates and uses such objects. A native method may also inspect and use objects created by Java application code.

Figure 3:
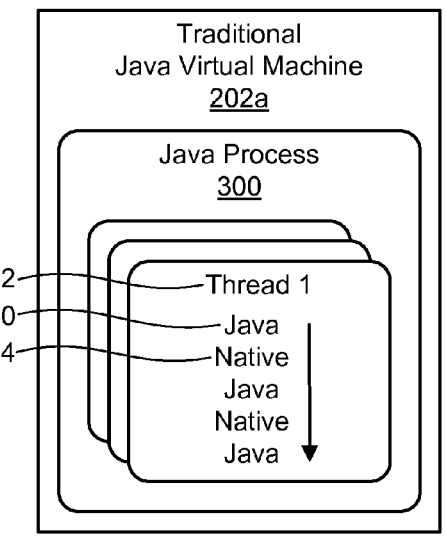
FIG. 3 is a high-level block diagram showing an example of a traditional Java Virtual Machine running both Java bytecode and native code.

Referring to FIG. 3, as previously mentioned, traditionally, both the Java bytecode 200 and the native code 304 are executed in the same process 300 and by the same thread 302 as execution transitions between the two. FIG. 3 shows a high-level view of a traditional Java Virtual Machine 202a. As shown, in a single Java process 300, execution alternates between the Java bytecode 200 and the native code 304 as the Java bytecode 200 calls the native code 304 and vice versa.

Figure 4:
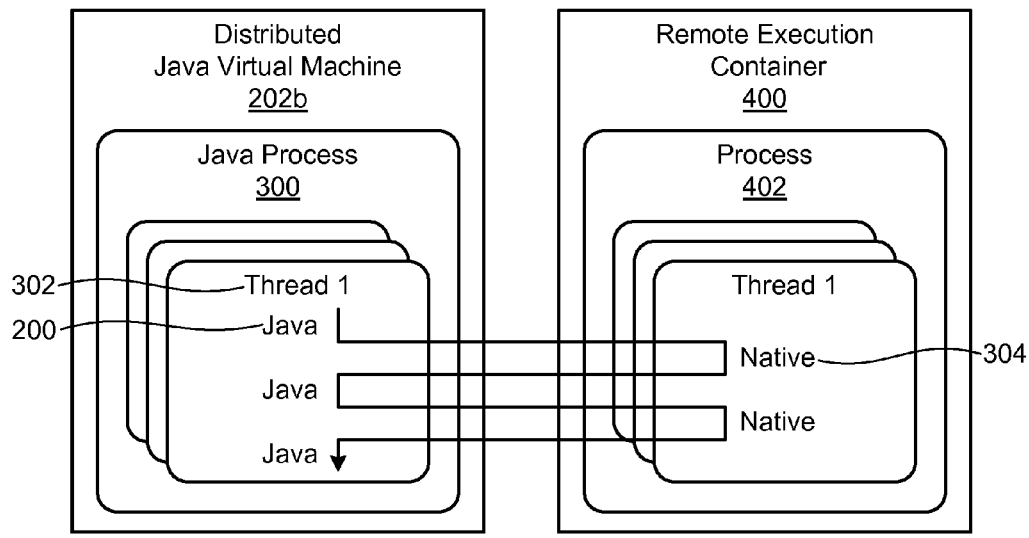
FIG. 4 is a high-level block diagram showing an example of a distributed Java Virtual Machine running both Java bytecode and native code.

Referring to FIG. 4, however, in a distributed Java Virtual Machine 202b, it is possible to execute native code 304 in one or more remote execution containers 400 which may be hosted in separate processes 402 on the same or different machines from where the Java bytecode 200 is executed. In such environments, the native code 304 may be unaware that it is executing separately from the Java Virtual Machine 202b. Separating the Java bytecode 200 and native code 304 in this manner may help to prevent misbehaved native code 304 from destabilizing the Java Virtual Machine 202b. It may also enable the native code 304 to run in a different environment (e.g., security context, pointer width–32/64 bit) than the Java Virtual Machine 202b.

In both traditional Java Virtual Machines 202a and distributed Java Virtual Machines 202b, each native method 304 is restricted to running in a specific process (a single process 300 in a traditional Java Virtual Machine 202a, or a single remote execution container process 402 in a conventional distributed Java Virtual Machine 202b). In a conventional distributed Java Virtual Machine 202b, different native methods 304 may run in different remote execution container processes 402. However, each time a particular native method 304 is executed, it must run in the same process 402 as all other invocations of that native method 304. As previously mentioned, this may cause problems when running certain types of legacy native code, which may only allow one instance of that code to be executed in a process 402. This may be due to the native code's use of statics or other resources that are shared within the process 402. This limitation prevents multiple instances of the legacy native code from being executed in association with the same Java Virtual Machine 202.

As a result, techniques are needed to enable executing multiple copies of the same native code 304 in a Java Virtual Machine 202, such as a distributed Java Virtual Machine 202b. Ideally, such techniques may be accomplished by way of a simple programming API. FIGS. 5 through 9 describe various techniques for enabling execution of multiple copies of the same native code 304 in a Java Virtual Machine 202.

Figures 5, 6:
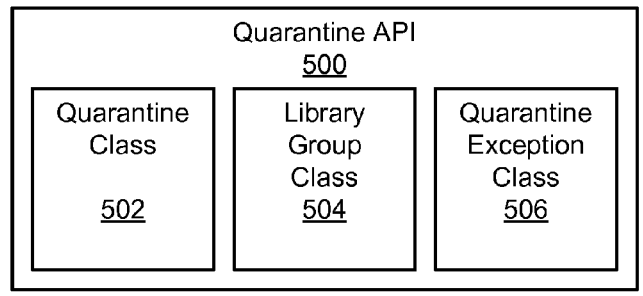
FIG. 5 is a high-level block diagram showing various classes that may be included in a new Quarantine API to enable execution of multiple copies of the same native code.
FIG. 6 is a code snippet showing operation of the quarantine class illustrated in FIG. 5.

Referring to FIG. 5, in certain embodiments in accordance with the invention, several classes may be provided through a new Quarantine API 500 to enable multiple copies of native code 304 to execute in a Java Virtual Machine 202. These classes will be referred to hereinafter as the Quarantine class 502, Library Group class 504, and Quarantine Exception class 506.

In order to use the Quarantine API 500, a developer may create subclasses of the Quarantine class 502 and define native methods on these subclasses. For example, consider the code snippet 600 illustrated in FIG. 6. As shown, line "1" of the code snippet 600 creates a new class "MyQuarantineClass" that extends the Quarantine class 502 (MyQuarantineClass is a subclass of the Quarantine class 502). Lines "2" and "3" define several native methods ("native1" and "native2") within MyQuarantineClass. The native methods in this example accept strings as inputs, but do not return any values.

Lines "6" through "11" show a small program that uses the newly created MyQuarantineClass. As shown, lines "7" and "8" create two instances of MyQuarantineClass called "quarantineCls1" and "quarantineCls2," respectively. Line "10" calls native1 on the first instance and line "11" calls native1 on the second instance.

Figure 7:
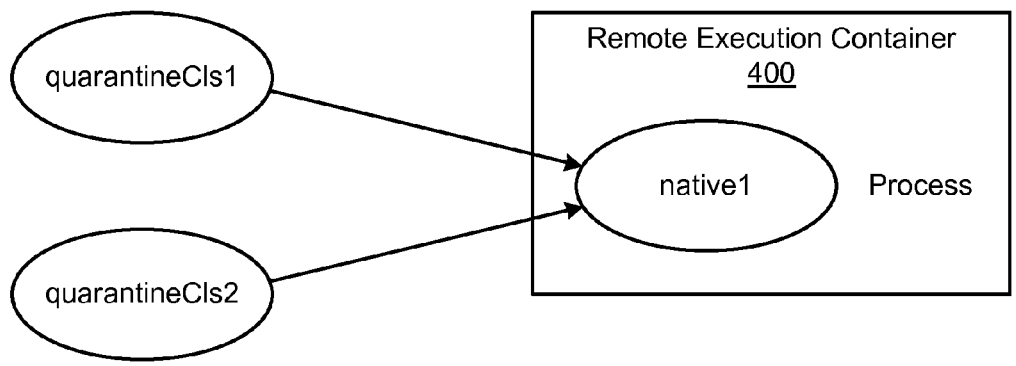
FIG. 7 shows execution of native methods in a conventional distributed Java Virtual Machine.

Referring to FIG. 7, in a conventional distributed Java Virtual Machine, any call to native1, regardless of whether the call originates from quarantineCls1 or quarantineCls2, would execute the same native code in the same process in the same remote execution container 400. The conventional distributed Java Virtual Machine prevents multiple instances of the native code from executing in the same process 400.

Figure 8:
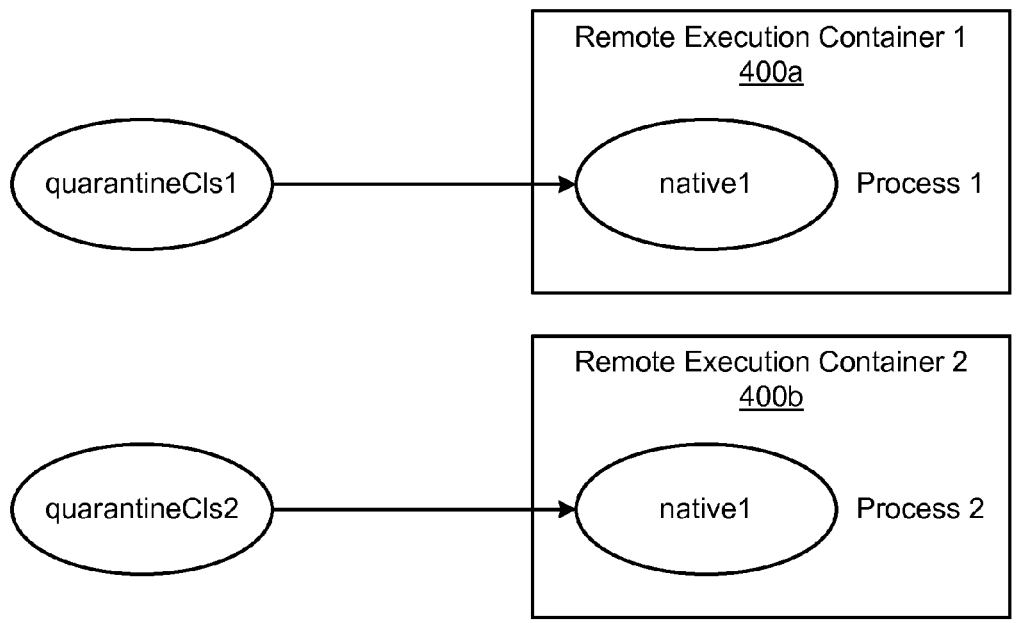
FIG. 8 shows execution of native methods in an enhanced distributed Java Virtual Machine in accordance with the invention.

However, referring to FIG. 8, using the new Quarantine API 500 API illustrated in FIG. 5, a call to native1 from quarantineCls1 will invoke the native code in a first process in a first remote execution container 400a, whereas a call to native1 from quarantineCls2 will invoke a copy of the same native code in a second process in a second remote execution container 400b. In this way, two copies of the same native code are created, each running in a different process. Each of these copies may have exclusive use of resources in the process in which it runs. For example, a subclass of the Quarantine class 502 may be created that has native methods that interact with a COBOL engine. Since the native methods will run in their own processes for each instance of the subclass that is created, there can be multiple copies of the COBOL engine. A COBOL engine provides just one example of legacy code that may benefit from the invention and is not intended to limit the scope of the invention.

Referring again to FIG. 5, the Library Group API class 504 is provided to enable finding the native code associated with a particular Quarantine subclass. A Library Group object, which is an instance of the Library Group class 504, stores a list of native methods associated with a particular Quarantine subclass. When a native method is invoked in a remote execution container process 402 associated with a Quarantine subclass object instance, the remote execution container process 402 finds the native code associated with the native method using the Library Group object. If the native code associated with the native method cannot be found, an UnsatisfiedLinkException may be thrown.

The Quarantine Exception class 506 is provided to generate exceptions when problems with a Quarantine object instance or associated remote execution container process 402 occur. For example, if a native method is called for a Quarantine object instance but the associated process 402 has a problem or fails, a Quarantine Exception may be thrown to indicate that a problem has occurred. This may allow an application to catch the exception and either terminate or create a new instance of the Quarantine subclass. A Quarantine Exception may also be thrown, for example, if a communication problem occurs between a Quarantine object instance and an associated remote execution container process 402. Other Quarantine Exceptions are also possible and within the scope of the invention.

Figure 9:
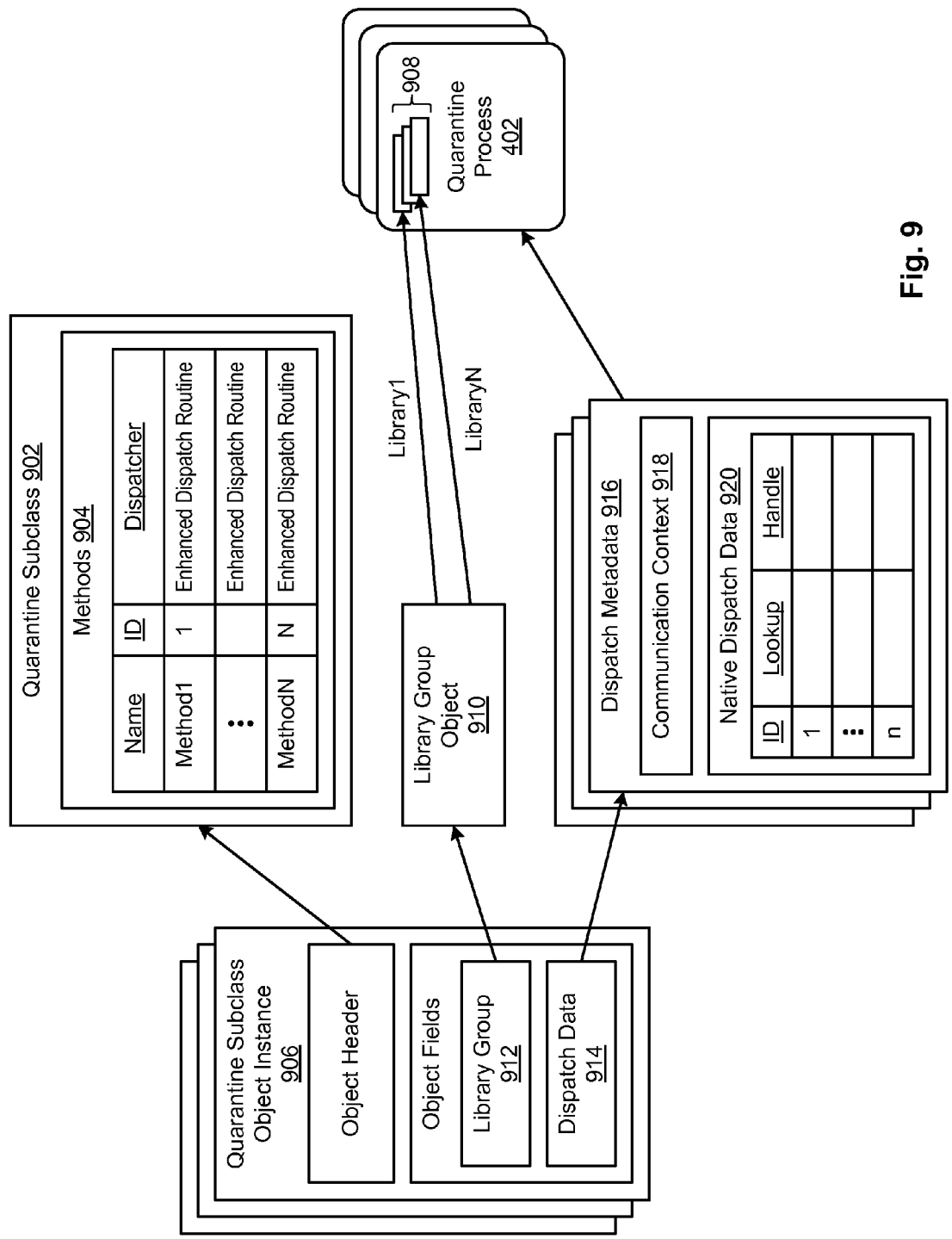
FIG. 9 is a high level block diagram showing various techniques supporting operation of an enhanced distributed Java Virtual Machine in accordance with the invention.

Referring to FIG. 9, various techniques supporting operation of an enhanced distributed Java Virtual Machine 202b in accordance with the invention are illustrated. As previously mentioned, the distributed Java Virtual Machine 202b may be modified such that when a new instance of a Quarantine subclass is created, a matching Quarantine process 402 in a remote execution container 400 is created. When creating a matching process 402, the following steps may be performed:

First, control may be taken of file handles for standard input and output for the process 402. These handles may be used to monitor the process 402 for output, transfer the output back to the Java Virtual Machine 202b, and make the output available through methods 904 defined on the Quarantine subclass 902. Methods 904 defined on the Quarantine subclass 902 may also be used to send data to the standard input for the Quarantine process 402. When these methods 904 are called, data may be transferred to the Quarantine process 402 in the remote execution container 400 using the file handles discussed above. These file handles may be stored in communication context information 918 associated with a Quarantine subclass object instance 906.

Second, the process 402 may be configured to look up libraries listed in a Library Group object 910 associated with the Quarantine subclass object instance 906. A Library Group field 912 in the object instance 906 may identify the Library Group object 910 associated therewith. If any of these libraries cannot be looked up, an UnsatisfiedLinkException may be thrown. To enable a process 402 to look up the libraries, runtime linkage information may be communicated to the process 402 by the Java Virtual Machine 202b. Upon looking up the libraries, the handles to the libraries may be stored so they are accessible when making later calls to the Quarantine process 402. In FIG. 9, the arrows between the Library Group object 910 and the Quarantine process 402 illustrate the relationship between libraries 908 loaded in the Quarantine process 402 and those listed in the Library Group object 910.

Third, various types of information 916 (also referred to as "dispatch metadata" 916) may be placed into a field (shown as dispatch data 914) in the corresponding Quarantine subclass object instance 906. This information 916 may include, for example, communication context 918 needed to send requests to the matching Quarantine process 402, and handles for standard input, output, etc., as previously discussed. The information 916 may also include a list 920 of natives associated with the Quarantine subclass object instance 906. Among other information, this list 920 may store a unique ID and lookup information for each native, as well as handles needed to invoke the natives in the matching Quarantine process 402. In general, the dispatch metadata 916 is used to efficiently dispatch natives associated with a particular Quarantine subclass object instance 906.

To enable running multiple copies of the same native code, the native lookup and dispatch algorithm within the Java Virtual Machine 202b may be modified. Because the same native may be loaded multiple times into different processes 402 (as opposed to once in a single process), the Java Virtual Machine 202b may be modified to efficiently decide which process 402 to dispatch a native to when it is invoked. In a traditional Java Virtual Machine 202a or a non-enhanced distributed Java Virtual Machine 202b, the first time a native is executed, System.loadLibrary( ) is used to search through libraries for the native. When the native is found, it is marked as resolved and code is invoked to dispatch that native either directly in a traditional Java Virtual Machine 202a or to a remote process 402 in a distributed Java Virtual Machine 202b. It is important to note that in a traditional or non-enhanced distributed Java Virtual Machine 202 the same method in the same process is always invoked. In an enhanced distributed Java Virtual Machine 202b, this is not sufficient since the native has to be looked up in every process 402 in which it is invoked, and needs to be dispatched differently for each instance 906 of the subclass 902. As a result, the lookup process for a native may be modified in an enhanced distributed Java Virtual Machine 202b as follows:

First, the first time a native of a Quarantine subclass 902 is executed, information needed to look up the native is stored in the list 904 of natives, and the native is marked as resolved. The code that is used to dispatch the native is set to an enhanced dispatch routine, which performs the extra work of determining which object instance 906 initiated the method call, and the corresponding process 402 in which to dispatch the native. One key insight to providing this functionality is that when a native method is called for an object instance 906, the first parameter is the object itself. This allows dispatch metadata 916 to be retrieved for the object instance 906, thereby allowing the native to be efficiently dispatched in the process 402 associated with the object instance 906.

Second, when an enhanced dispatch routine for a native is called for the first time, the native is looked up in the process 402 using the library handles obtained when the process 402 was created. If the lookup fails, an UnsatisfiedLinkException may be thrown. If the lookup is successful, however, the handles needed to invoke the native remotely may be stored in the native dispatch data 920, specific to the object instance 906, using the unique ID. The next step is then executed as if the native had already been looked up when the routine was called.

Third, when the enhanced dispatch routine is called and the native has already been looked up, the unique ID is used to look up the entry in the native dispatch data 920 associated with the Quarantine subclass object instance 906, thereby allowing the native's handle to be retrieved. The native may then be dispatched in an efficient manner using the handle. Because the Quarantine subclass object instance 906 is the first parameter in native method calls, this information may be used to efficiently retrieve the native dispatch data 920, since this data is stored in a field 914 of the Quarantine subclass object instance 906.

As mentioned previously, a matching process 402 is created when a Quarantine subclass object instance 906 is created. To complete the lifecycle, the process 402 may be terminated when the object instance 906 is finalized or a kill method is called on the object instance 906. If a kill method is called, then all current or subsequent calls to methods on the Quarantine subclass object instance 906 will return an exception.

The flowcharts and block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in a block may occur out of the order noted in the Figures. For example, two blocks shown in succession may, in fact, be executed substantially concurrently, or the blocks may sometimes be executed in the reverse order, depending upon the functionality involved. Some blocks may be deleted or other blocks may be added depending on the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for running multiple copies of the same native code in a Java Virtual Machine, the method comprising:
   providing a class to enable segregating multiple running copies of the same native code;
   defining, within the class, a native method configured to dispatch operation of the native code;
   creating, in a Java Virtual Machine (JVM) process, a first instance of the class;
   calling the native method in the first instance, wherein calling the native method in the first instance causes a first copy of the native code to run in a first process outside of the JVM process;
   creating, in the JVM process, a second instance of the class; and
   calling the native method in the second instance, wherein calling the native method in the second instance causes a second copy of the native code to run in a second process outside of the JVM process.

2. The method of claim 1, further comprising terminating the first process when one of the following occurs: the first instance is finalized and a kill method of the first instance is called.

3. The method of claim 1, wherein the first copy of the native code has exclusive use of resources within the first process, and the second copy of the native code has exclusive use of resources within the second process.

4. The method of claim 1, further comprising generating first dispatch data to enable communication between the first instance and the first copy of the native code, and generating second dispatch data to enable communication between the second instance and the second copy of the native code.

5. The method of claim 4, wherein generating first dispatch data comprises acquiring file handles for standard input and output associated with the first copy of the native code, and generating second dispatch data comprises acquiring file handles for standard input and output associated with the second copy of the native code.

6. The method of claim 1, wherein the first instance includes methods to receive output from the first copy of the native code, and the second instance includes methods to receive output from the second copy of the native code.

7. The method of claim 1, wherein the first instance includes methods to send input to the first copy of the native code, and the second instance includes methods to send input to the second copy of the native code.

8. The method of claim 1, further comprising, prior to running the first copy of the native code, loading the native code from a library.

9. The method of claim 8, further comprising throwing an exception if the library is not available.

10. The method of claim 1, wherein calling the native method in the first instance comprises using information stored in the first instance to efficiently dispatch the first copy of the native code.

11. A computer program product to run multiple copies of the same native code in a Java Virtual Machine, the computer program product comprising a non-transitory computer-readable storage medium having computer-usable program code embodied therein, the computer-usable program code comprising:
    computer-usable program code to provide a class to enable segregating multiple running copies of the same native code;
    computer-usable program code to define, within the class, at least one native method configured to dispatch operation of the native code;
    computer-usable program code to create, in a Java Virtual Machine (JVM) process, a first instance of the class;
    computer-usable program code to call the native method in the first instance, wherein calling the native method in the first instance causes a first copy of the native code to run in a first process outside of the JVM process;
    computer-usable program code to create, in the JVM process, a second instance of the class; and
    computer-usable program code to call the native method in the second instance, wherein calling the native method in the second instance causes a second copy of the native code to run in a second process outside of the JVM process.

12. The computer program product of claim 11, further comprising computer-usable program code to terminate the first process when one of the following occurs: the first instance is finalized and a kill method of the first instance is called.

13. The computer program product of claim 11, wherein the first copy of the native code has exclusive use of resources within the first process, and the second copy of the native code has exclusive use of resources within the second process.

14. The computer program product of claim 11, further comprising computer-usable program code to generate first dispatch data to enable communication between the first instance and the first copy of the native code, and generate second dispatch data to enable communication between the second instance and the second copy of the native code.

15. The computer program product of claim 14, wherein generating first dispatch data comprises acquiring file handles for standard input and output associated with the first copy of the native code, and generating second dispatch data comprises acquiring file handles for standard input and output associated with the second copy of the native code.

16. The computer program product of claim 11, wherein the first instance includes methods to receive output from the first copy of the native code, and the second instance includes methods to receive output from the second copy of the native code.

17. The computer program product of claim 11, wherein the first instance includes methods to send input to the first copy of the native code, and the second instance includes methods to send input to the second copy of the native code.

18. The computer program product of claim 11, further comprising computer-usable program code to, prior to running the first copy of the native code, load the native code from a library.

19. The computer program product of claim 18, further comprising computer-usable program code to throw an exception if the library is not available.

20. The computer program product of claim 11, wherein calling the native method in the first instance comprises using information stored in the first instance to efficiently dispatch the first copy of the native code.

* * * * *